United States Patent [19]
Kijowski et al.

[11] Patent Number: 6,096,352
[45] Date of Patent: Aug. 1, 2000

[54] METHOD OF MANUFACTURE OF CREAM CHEESE PRODUCTS

[75] Inventors: Mark Kijowski, Chicago; Mohamed Saad Kettani, Schaumburg; Sandra Ann Trop, Palos Park, all of Ill.

[73] Assignee: Kraft Foods, Inc., Northfield, Ill.

[21] Appl. No.: 09/122,963

[22] Filed: Jul. 27, 1998

[51] Int. Cl.[7] ..................................................... A23C 9/12
[52] U.S. Cl. ........................ 426/36; 426/38; 426/39; 426/40
[58] Field of Search .................................. 426/36, 38, 39, 426/40

[56] References Cited

U.S. PATENT DOCUMENTS

| | | | |
|---|---|---|---|
| 2,160,159 | 5/1939 | Lundstedt et al. | 99/117 |
| 2,224,720 | 12/1940 | Butterworth et al. | 99/116 |
| 2,387,276 | 10/1945 | Link | 99/116 |
| 3,929,892 | 12/1975 | Hynes et al. | 426/582 |
| 4,244,983 | 1/1981 | Baker | 426/582 |
| 4,324,804 | 4/1982 | Davis | 426/36 |
| 4,379,175 | 4/1983 | Baker | 426/582 |
| 4,597,971 | 7/1986 | Davis | 426/36 |
| 4,919,943 | 4/1990 | Yee et al. | 426/39 |
| 5,064,660 | 11/1991 | Silver | 426/36 |

FOREIGN PATENT DOCUMENTS 0 626 136 A2  11/1994  European Pat. Off. .

OTHER PUBLICATIONS

Covacevich, et al., "Mozzarella and Cheddar Cheese Manufacture by Ultrafiltration Principles", *J. Dairy Sci.*, 61:701–719 (1978).

Kosikowski, Frank V., "Cheesemaking by Ultrafiltration", *Our Industry Today*, vol. 57, pp. 488–491 (1974).

Volchkov, I.I., "OSM–5 Separator for High–Fat Cream", *Trudy, Vsesoyuznyi Nauchno–Issledovatel'skii Institut Molochnoi Promyshlennosti*, 1970, 27:134–36, Abstract of Journal Article.

Kosikowski, et al., "Manufacture of Cheddar Cheese Types from Highly Concentrated Ultrafiltered Retentate Precheeses", Journal of Dairy Science, vol. 68 (Suppl. 1); p. 52., 1985, Abstract of Journal Article.

*Primary Examiner*—Chhaya D. Sayala
*Attorney, Agent, or Firm*—Fitch, Even, Tabin & Flannery

[57] ABSTRACT

The present invention is directed to methods for utilizing, frozen concentrated milkfat to manufacture cream cheese. Generally in accordance with the method, frozen concentrated milkfat which has been stored in a solid state is comminuted and mixed with a dairy fluid prior to melting of the milkfat, and the frozen concentrated milkfat is melted while in contact with the dairy fluid to provide a cream cheese mix, which is subsequently fermented, separated from whey and packaged to provide a cream cheese product with excellent keeping quality without oxidized off flavors.

8 Claims, 2 Drawing Sheets

METHOD OF MANUFACTURE OF CREAM CHEESE PRODUCTS

FIELD OF THE INVENTION

The present invention relates generally to methods for production of cream cheese products utilizing concentrated milkfat.

BACKGROUND OF THE INVENTION

Cream cheese and Neufchatel cheese are soft, mild, acid-coagulated uncured cheeses made of dairy products including cream, such as mixtures of cream and milk. Cream cheese, which is stored under refrigeration conditions, has a smooth and butter-like consistency with a delicate dairy flavor profile, which does not accommodate off-flavors. The texture and body of cream cheese at refrigeration temperatures is such that the cream cheese can be sliced and spread. In making cream cheese, sweet whole milk and/or skim milk and sweet cream are typically blended in preselected proportions to form a cream cheese mix. The cream cheese mix normally has a butterfat content of from about 10% to about 14% (and in certain make procedures up to as much as 20%) by weight, so that after processing, the finished cream cheese product will have a butterfat content of from about 33% to about 35% (and in certain make procedures such as wheyless procedures, up to as much as 38%) by weight.

The cream cheese mix is preheated (e.g., to about 135° F.), homogenized and pasteurized, after which it is cooled, usually to a temperature between 62° F. and 92° F. and inoculated with a lactic acid culture. Rennet may be used to aid the coagulation of the mix. The mix is held at the inoculation temperature until it has ripened and a coagulum is formed. The acidity of the coagulum may typically be in the range of from about 0.6% to about 0.9% (calculated as percent equivalent lactic acid), and the pH of the cultured coagulum may typically be in the range of from about 4.2 to about 5.0.

After the desired degree of culture activity and acidity is obtained, the curd is separated from the whey and is thereafter packaged. One well known process for making cream cheese and separating cream cheese curd from whey includes a mechanical separation of the curd. This process is disclosed in U.S. Pat. No. 2,387,276 to Link. In accordance with the method of the Link patent, after the mix is ripened to form a coagulum, the coagulum is heated to an elevated temperature to break the viscosity of the mix. Thereafter, the heated mix is centrifuged at the elevated temperature (e.g., 180° F.) to separate the curd from the whey.

Milkfat is a commodity dairy product which has a relatively high seasonal price variation, with highest cost season typically coinciding with peak cream cheese production requirement. Concentrated milkfat, which, if properly prepared, can be frozen and stored for at least 12 months before use, could be purchased during the low cost season, then used to make cream cheese during the high cost, high demand season. However, the potential use of concentrated milkfat in cream cheese production poses several quality issues: the concentrated milkfat should be melted and thoroughly mixed with, and in the correct ratio to, the milk and/or cream to form a cream cheese mix of appropriate composition. Poor mixing and/or incorrect composition will lead to defects in the finished product such as butterchips. If the concentrated milkfat is melted and held at an elevated temperature for any extended period of time, the fat may begin to oxidize and the finished product will have a rancid off-flavor or limited storage stability.

Many efforts have been made to develop cream cheese products which contain various controlled fat levels. Examples of such efforts are disclosed in U.S. Pat. No. 4,324,804 to Davis relating to soft-bodied cream cheese production. U.S. Pat. No. 2,161,159 to Lundstedt, et al., U.S. Pat. No. 3,929,892 to Hynes, et al., U.S. Pat. Nos. 4,244,983 and 4,379,175 to Baker, have reduced fat levels and describe the incorporation of a variety of dairy components into cream-cheese type products. However, none of these references describe the incorporation of stored, concentrated milkfat under conditions which preserve its characteristics without generation of off-flavors.

Accordingly, it is an object of the present invention to provide methods utilizing stored, concentrated milkfat components for producing cream cheese products which have the appearance, taste, consistency and texture of cream cheese made with a conventional cream-containing cream cheese mix.

It is another object to provide commercially effective methods for making cream cheese products which may be adapted to large scale commercial operations.

These and other objects of the invention will become more apparent from the following detailed description and accompanying drawings.

SUMMARY OF THE INVENTION

Figure 1:
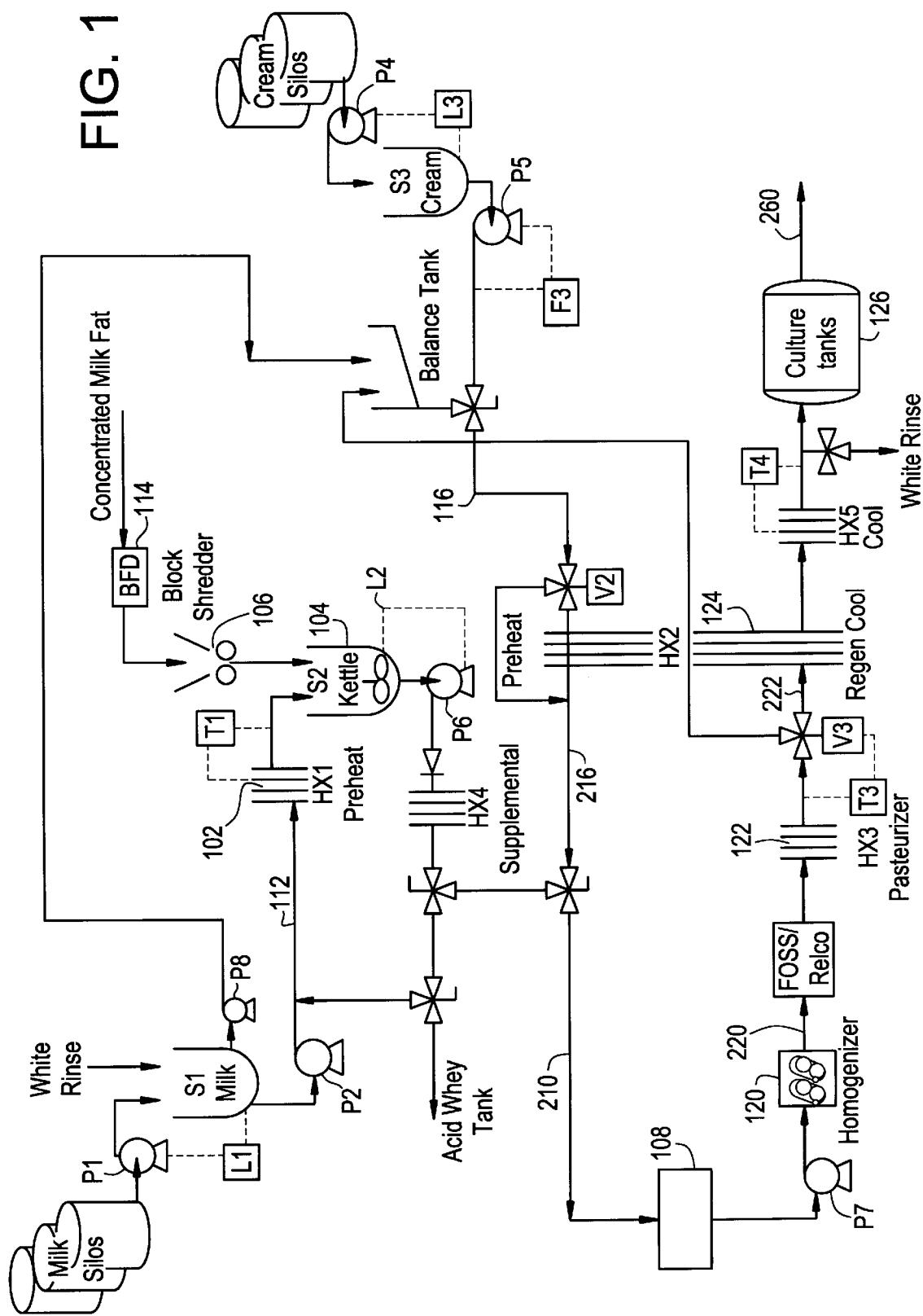
FIG. 1 is a schematic diagram illustrating the steps of a preferred method of the invention for producing cream cheese containing concentrated milkfat.

Generally, the present invention is directed to methods for utilizing concentrated milkfat to manufacture cream cheese. Generally in accordance with the method, frozen concentrated milkfat in a solid state is mixed with a dairy fluid prior to melting of the milkfat, and the frozen concentrated milkfat is melted while in contact with the dairy fluid to provide a cream cheese mix. By "frozen concentrated milkfat" is meant a concentrated milkfat composition prepared by the separation of cream from milk to provide a dairy-based composition which is at least about 70 weight percent milkfat, followed by relatively rapid freezing (e.g., within 10 days of the time of separation of the cream from the milk and preferably within 5 days to a storage temperature of less than about +10° F., and which has been stored at a temperature of less than about +20° F. for at least about one month. Desirably, the frozen concentrated milkfat will have a thermal history which does not exceed a temperature of +20° F. during storage, prior to its being contacted with a dairy fluid in the preparation of a cream cheese mix in accordance with the methods of the present invention. By "solid state" is meant that at least about 25 percent by weight of the total milkfat component of the concentrated milkfat composition is in solid crystalline form.

The frozen concentrated milkfat should be mixed uniformly with and melted in a dairy fluid such as milk and/or cream, in less than about 5 hours, and preferably in less than about 10 minutes, to provide a uniformly blended, and preferably uniformly homogenized, cream cheese mix. The blending process may be a continuous process or a batch process, but it is important that the blending process be carried out under time and temperature conditions which preserve the quality of milkfat.

The process enables the use of concentrated milkfat in cream cheese, as a full or partial replacement for cream while retaining the taste, texture and other organoleptic qualities of conventional cream cheese products. This may be accomplished by a continuous process in which the frozen, concentrated milkfat is continuously blended with an optionally preheated milk and/or cream or other suitable dairy fluid stream. For example, large blocks of frozen concentrated milkfat may be crushed or shredded and continuously blended with preheated milk (and/or cream) in a small agitated surge kettle (optionally, preheated cream can be continuously blended in-line following the kettle). The mix, which can be heated further, may then be immediately homogenized, pasteurized, cooled as in a conventional cream cheese make process, cultured and separated to produce a cream cheese curd of excellent quality.

The milk (and/or cream) component may be preheated to a temperature to provide sufficient thermal energy to melt the concentrated milkfat, and ensure with mixing that the stream of concentrated milkfat and milk is substantially all in the liquid phase, and uniformly blended prior to homogenization. The blended cream cheese mix stream should have a temperature of at least about 125° F. A temperature of approximately 135° F. is a useful preheat temperature for typical melt functionality.

When using a batch mixing system, agitation in the batch mixing zone should be sufficient to produce substantially complete dispersion of the concentrated milkfat.

Surge kettle to homogenizer residence time should be sufficient to ensure complete melting and mixing of the concentrated milkfat, but minimized to reduce milkfat oxidation.

DETAILED DESCRIPTION OF THE INVENTION

Generally, the present invention is directed to methods for utilizing frozen concentrated milkfat which has been stored for at least a month at temperatures not exceeding about +20° F., and preferably not exceeding about +10° F., to manufacture cream cheese. Generally, the concentrated milkfat ("CMF") is a commercially available product which is normally prepared from cream. The cream is pasteurized at specified time and temperature conditions (e.g., minimum of 185° F. for 16 seconds). The pasteurized cream is then cooled to approximately 40° F. and held overnight. This cream is then subjected to a prechurning treatment which consists of heating to approximately 53–54° F. for a minimum of 4 hours in order to stabilize the cream. The preheated cream is then churned and butter granules are formed. The next step requires draining the buttermilk from butterfat. The moisture content may be adjusted to obtain a minimum of 80% fat. Concentrated milkfat is then pumped, packaged and frozen. Salt, flavoring or coloring are not usually added during this process. Typically, CMF consists essentially of a minimum of 80% milkfat, 18.5% maximum of moisture, and about 1 percent protein. The CMF can be packaged in 68 lb. blocks wrapped in plastic liners or parchment paper and boxed in cardboard. The fill temperature is around 55° F. and boxes are cooled to −15° F. within one to two weeks. At these storage conditions, CMF can be held 12 months without developing off-flavors or oxidative rancidity. Frozen concentrated milkfat and other dairy based ingredients are described in "Dairy Based Ingredients" by Ramesh Chandan, Eagan Press, St. Paul, Minn., pgs 34–39, 1997.

Generally in accordance with the method, frozen concentrated milkfat is contacted and mixed uniformly with a dairy fluid such as milk or a mixture of milk and cream, to melt the milkfat while it is in contact with the dairy fluid and to provide a uniformly homogenized cream cheese mix. The weight ratio of the dairy fluid to the frozen concentrated milkfat with which it is mixed will typically be from about 2:1 to about 8:1. Desirably, the melting of the frozen concentrated milkfat while in admixture with the dairy fluid, will be accomplished in less than about 5 hours, preferably in less than about three hours, and typically in less than about 10 minutes. The blending process may be a continuous process or a batch process, but it is important that the blending process be carried out under time and temperature conditions which preserve the quality of milkfat, best insured with smallest volume possible for the kettle.

The process enables the use of concentrated milkfat in cream cheese, as a full or partial replacement for cream while retaining the taste, texture and other organoleptic qualities of conventional cream cheese products. This is preferably accomplished by a continuous or semi-continuous process in which frozen blocks of concentrated milkfat are comminuted by crushing, shredding or extruding to provide strands or particles of frozen concentrated milkfat preferably having a surface to volume ratio of at least about 7, and more preferably at least about 25, and blending the comminuted frozen milkfat with pre-heated milk (and optionally, cream) in an agitated mixing or surge zone, or kettle (optionally, preheated cream can be continuously blended in-line following a blending zone or surge kettle). The blended mix may be substantially immediately homogenized, pasteurized and cooled as in conventional cream cheese manufacturing processes, then cultured and separated. In addition, when using a batch mixing system, agitation in the batch mixing zone should best be sufficient to produce substantially complete dispersion of the concentrated milkfat. The time in the mixing zone (e.g., the surge kettle to homogenizer residence time) should best be sufficient to ensure complete melting and mixing of the concentrated milkfat. The zone in which the frozen, comminuted concentrated milkfat is contacted with the fluid dairy component may be blanketed with nitrogen, if desired, to reduce oxygen content.

As indicated, the present method utilizes a preferably preheated dairy fluid cream cheese mix component, such as fluid milk or fluid milk and cream mixtures, to contact and melt the frozen concentrated milkfat. Fresh whole milk is the preferred fluid milk source, but skim milk, concentrated milk, and concentrated or reconstituted skim milk or mixtures thereof may be used as a fluid dairy source. For example, concentrated skim milk preferably having a non-fat milk solids content of from about 20 to about 30%, may be used as a preheated fluid milk component for blending with the concentrated milkfat component to provide a uniform, homogenized cream cheese mix. All percentages used herein are by weight, dry basis, and all temperatures are in ° F. unless otherwise indicated. The source of concentrated skim milk can be produced by ultrafiltration treatment to provide a skim milk retentate. The concentrated skim milk source can also be provided by dry cottage cheese curd which is homogenized with water. Dry cultured cottage cheese curd is a well known dairy product, which is a drained, uncreamed skim milk cheese curd made by inoculating skim milk with culture and allowing the product to coagulate. Dry cottage cheese curd may also be made by a direct acidification method. Generally, dry cottage cheese curd comprises about 20% to 25% by weight non-fat milk solids and 75% to 85% by weight water. When used herein, the term "dry cottage cheese curd" refers to a soft cheese curd such as cottage cheese or baker's cheese curd product having the above solids and moisture characteristics. It is important that the fluid milk not be exposed to oxidizing or flavor-degrading temperature-time treatments. Concentrated skim milk may also be produced by evaporation or by reconstitution of dried skim milk. These latter sources of concentrated skim milk are less preferred.

The skim milk used to provide the concentrated skim milk source may be subjected to well known heat treatment conditions to co-precipitate the serum proteins with the casein during preparation of the dry cottage cheese curd such as described in U.S. Pat. No. 3,039,879 to Vakaleris.

As indicated, after uniform blending of the low temperature concentrated milkfat cream cheese mix from the frozen concentrated milkfat and a fluid dairy source, a cream cheese mix is provided which, after culturing and separation of whey, will provide the desired cream cheese components at desired levels. A conventional cream cheese mix useful for the present invention has milkfat (butterfat) present at a level of from about 10 to about 20 percent. The cream cheese mix may be made from cream or a mixture of cream and milk or a mixture of cream, milk and partially skimmed milk or skim milk solids in accordance with conventional practice. The cream cheese mix will typically have non-fat milk solids present at a level of from about 6 to about 8 percent by weight. Wheyless cream cheese mixes may have milkfat present at a level of 33–36 percent by weight, and 8–14 percent nonfat milk solids. In any event, the dairy fluid and the frozen concentrated milkfat are blended in suitable proportions to provide a cream cheese mix in which at least about 10 percent by weight, and preferably at least about 50 to 80 percent by weight of the milkfat in the cream cheese mix is provided by the frozen milkfat component.

The cream cheese mix may be homogenized, pasteurized and cooled to a temperature in the range of about 70° F. to 78° F. prior to inoculation with a suitable cream cheese culture, such as a lactic acid producing culture. The cream cheese mix may be permitted to ferment for a period of about 12–20 hours, at which time a coagulum forms. The coagulum is stirred until it is smooth. Thereafter, in cream cheese making procedures in which the curd is separated from the whey, the coagulum may be heated to break the coagulum and provide a cream cheese curd and whey mixture which is suitable for separation by centrifugal separators or by bag draining. Generally, the coagulum may be heated to a temperature of from about 170° F. to about 185° F. Upon separation, a conventional cream cheese product is provided which has a firm body, and which has a very finely divided milkfat component generally corresponding to the size distribution of the homogenized or unhomogenized fat component of the cream cheese mix.

The cultured cream cheese desirably comprises at least about 30 percent by weight of milkfat, at least about 3 percent by weight non-fat dairy protein, and less than about 55 weight percent water, based on the total weight of the cream cheese. The cream cheese further comprises at least about 45 percent by weight of total dairy solids. Furthermore, the finished cream cheese comprises not more than 55 percent moisture, based on the weight of the cream cheese. Preferably, to meet U.S. standard of identity requirements, the cream cheese products will have a milkfat content of at least about 33 percent by weight, of which at least about 10–25 percent by weight is derived from the frozen concentrated milkfat component, and a moisture content not exceeding about 55 percent by weight based on the weight of the cream cheese product.

Turning now to the drawings, the present invention will now be more particularly described with respect to the specific embodiment of the method of preparation schematically illustrated in FIG. 1. As shown in FIG. 1, cream cheese production equipment comprising a milk preheater 102, a surge kettle 104, a block crusher or shredder 106 and a shear mixer 108 are provided for uniformly and rapidly blending the concentrated milkfat and the preheated dairy fluid. An optional cream preheater 110 is also provided. The production apparatus further includes homogenizer 120, pasteurizer 122, cooling heat exchanger 124, culture tank 126, heat exchanger 128 and centrifugal separator 130. In accordance with the process flow of the continuous process embodiment illustrated in FIG. 1, a cream cheese mix is prepared from frozen concentrated milkfat and fluid milk and/or cream. The fluid milk will normally have a milkfat content of from about 2 to about 4 weight percent. Optionally, an unfrozen cream ingredient having a natural milkfat content of from about 36 to about 44 percent by weight, may also be used to provide some of the milkfat component. A fluid milk stream 112 is preheated by preheater 102 to sufficient temperature to melt the concentrated milkfat component and ensure that the stream leaving the surge kettle is approximately 135° F. When blending the frozen concentrated milkfat having a fat content of about 80 percent, a protein content of about 1 percent, a nonfat milk solids content of about 1 pecent, and a moisture content of about 18 percent, in a weight ratio of about 1:4 with fluid whole milk having a fat content of about 3.5, a final cream cheese mix is provided with a fat content of between about 12% and 16% fat. The fluid milk will initially typically have a temperature of about 35–40° F., and it is preheated to about 150° F. in order to provide latent heat energy to melt the frozen concentrated milkfat shreds. In this regard, the concentrated milkfat component, which is frozen and stored at a temperature of less than +10° F., in the form of 50–100 pound blocks 114, is processed through a block crusher or shredder 106 which reduces the milkfat to particles less than about one cubic inch, and preferably less than 0.25 cubic inch in size. Typically, the shredder for the frozen concentrated milkfat will be adapted to provide particles of about 2 inch strip in size. Any suitable shredder, crusher or extruder system may be used, such as the block conveyor, block feeding chute, rotating knife drum shredder, and block feeding device components of a Westphalia Separator BSMA 5000 system. In operation of such a shredder system, a 50–100 pound block of frozen concentrated milkfat is conveyed to a block feeding chute, from which it is metered by a variably controllable feeder to a rotating knife drum which cuts the block into small pieces, which are continuously directed into the surge tank 104 with the preheated fluid milk and/or cream component. The fluid milk 112, shredded or crushed concentrated milkfat 114 and optional cream 116 are mixed together in the surge tank 104 in appropriate proportions to provide a cream cheese mix having from about 10 percent to about 16 percent by weight fat, from about 2 to about 4 percent by weight milk protein, and from about 6 to about 10 nonfat milk solids.

Other mixes containing cream, whole milk, condensed skim milk and/or nonfat dry milk powder may be utilized with the frozen concentrated milkfat 114 in a similar manner depending on availability and cost considerations, in accordance with conventional practice. The surge kettle 104 is sized to minimize residence time, but at the same time provides a sufficient buffer for any fat concentration fluctuations which could be caused by fluctuations in concentrated milkfat or dairy fluid addition. In the illustrated embodiment, the surge kettle has a working volume of 50 gallons. The input rate for the frozen milkfat 114 is about 65 pounds per minute, the input rate of milk 112 for the preheated fluid milk stream 202 is about 1025 pounds per minute, and the input rate of fluid cream is about 130 pounds per minute. The output rate from the surge kettle is about 1220 pounds per minute, providing a nominal residence time of about 90 seconds in the surge kettle. The surge kettle 104 can be provided with a mixing agitator 105 such as a lightning mixer, to provide rapid and thorough mixing of the milk and/or cream and frozen concentrated milkfat. Agitation in the surge kettle should best be sufficient to guarantee complete dispersion of the concentrated milkfat without causing excessive foaming of the mixture.

The surge kettle to homogenizer residence time should desirably be sufficient to ensure complete melting and mixing of the concentrated milkfat, and is typically less than about 5 min. Optional shear mixers, strainers to remove any packaging material which might be associated with the frozen milkfat, and in-line mixers may also be used to aid in this process. It is noted that not all of the fluid milk used in the cream cheese mix need be preheated to form stream 202 for melting contact with the comminuted milkfat particles in surge kettle 104. A portion (e.g., 0–75%) of the milk may bypass (via conduit) the higher preheat temperature used to melt the frozen milkfat, and may subsequently be combined with the product blend issuing from the surge kettle. The portion of fluid milk which bypasses the surge kettle may be combined with cream and preheated to a lower temperature (e.g., 135° F.) before such combination.

The resulting blended cream cheese dressing mix 210 may be pumped through an optional sieve or filter to remove any potential paper or other food-safe packaging material from the frozen concentrated milkfat blocks which may have inadvertently passed through the shredder 106, and an optional shear mixer 108 (such as a Silverson mixer), to ensure full dispersion of the melted milkfat in the cream cheese dressing mix 210 exiting the surge kettle 104, and is homogenized at a homogenization pressure 2100 psig., and at a homogenizer input temperature of about 135° F. in single-stage or double stage homogenizer 120, to provide a uniformly homogenized cream cheese mix 220. The homogenized cream cheese mix 220 is then pasteurized by pumping the mixture through pasteurizer 122 at appropriate time and temperature conditions, such as a temperature of about 175° F. for about 17 seconds. The resulting pasteurized blend 222 is subsequently cooled to ambient temperature, and pumped to an incubation culture tank 126 such as a cold wall storage tank, for culturing of the mixture. In this regard, the pasteurized cream cheese dressing mix provided in the storage tank 126 may be cultured in a conventional manner by adding a conventional cream cheese starter culture at a level determined by the desired incubation period and temperature, to produce an acid curd, and to develop a desirable aromatic cream cheese flavor. The cream cheese starter culture may desirably be added with appropriate mixing, for example, at a level of about 1 percent by weight based on the weight of the mixture to be cultured, and the inoculated mixture may then be allowed to ripen in a quiescent state until a desired level of acidity is achieved, such as for a period of 10–20 hours or until a desired pH level, such as a pH in the range of pH 4.5 to pH 5.0, and preferably about pH 4.6–4.8 is attained. Upon completion of the fermentation, a cultured cream cheese dressing mix 260 is provided in the tank 126.

Like the cream cheese mix 210 exiting the surge kettle 104, the cream cheese mixture 260 has a butterfat content in the range of from about 10 to about 16 percent by weight, and a total dairy solids content of about 18 percent by weight. The resulting cultured mix may then be broken, the curd and whey of the broken mixture heated to a temperature of 170–185° F. in heat exchanger 128, and the curd and whey separated in centrifugal separator 130 by centrifugation as generally described in the above referred to Link patent. The resulting separated cream cheese curd is a firm bodied cream cheese product having a milkfat content of at least about 33 percent by weight and a total dairy solids content of at least about 45 percent by weight of the product. The product may be packaged under "hot pack" conditions by a conventional hot pack filling apparatus such as a hot pack filler (not shown) manufactured by Ben-Hil Auto-Pack Company, and other manufacturers, and is subsequently packaged at elevated temperature conditions suitable for providing superior keeping quality and extended shelf life. The product may also be chill rolled and packaged.

Having generally described the embodiment of the method illustrated in FIG. 1, that method will now be more particularly described with respect to specific examples which further illustrate various features of the present invention but are not intended to limit the scope of the invention, which is defined in the appended claims.

EXAMPLE 1

Regular whole milk is mixed with fresh fluid cream in a blender at appropriate ratios. The milk comprises 3.76 percent fat, 3.29 percent protein, 4.55 percent lactose and 12.61 percent total solids. The cream comprises 43.40 percent fat, 48.71 percent total solids and 1.89 percent protein. Concentrated milkfat ("CMF"), also known as plastic cream, is stored frozen in the form of blocks at about minus 15° F. and is shredded by suitable shredder system, such as the block conveyor, block feeding chute, rotating knife drum shredder, and block feeding device components of a Westphalia Separator BSMA 5000 butter melting system, prior to being mixed with the blend of milk and cream. The butter melting components of the Westphalia Separator BMSA 5000 system are not utilized, because the CMF is melted in the fluid milk component of the cream cheese mix, not in a butter melting system. The frozen, concentrated milkfat is prepared by churning, and comprises approximately 80 percent fat, 18 percent moisture and 1 percent protein. The blend of milk and cream is heated to a temperature of 150° F. and pumped into a Phaudler kettle at low agitation of 72 rpm, where frozen shreds of CMF are added continuously in a uniform manner. As the shreds are added, the new mix of milk, cream and CMF is subjected to a two-stage homogenization step at 2000 psi first stage and 500 psi second stage. Once homogenized, the mix is subjected to high temperature, short-time pasteurization treatment of 178° F. for 18 seconds, and precooled to 72° F. A bulk cream cheese starter culture is added at about 0.75 weight percent level in a set tank to inoculate the precooled mix, and fermentation is continued for approximately 16 hours, until the pH drops to about 4.52. Once the desired pH is reached, the mix is broken by means of agitation. This mix is then subjected to a heating step at 180° F. at which time the separation begins. Whey and curd are then generated by means of a centrifugal separator. To the hot curd, a mixture of salt and gum, or a blend of different gums at a 2.8:1 ratio, is added through a feeder and then the finished curd is pumped into a blender. The product obtained is then cooled and packaged. After packaging, the cream cheese type product of the invention has the appearance, taste, consistency and texture of conventionally manufactured cream cheese. It has excellent flavor over a shelf life of 6 months at 40 F.

EXAMPLE 2

The process of Example 1 is substantially repeated, with the exception of melting the concentrated milkfat (CMF) in a conical vat processor (CVP) prior to adding it to the mixture of milk and fresh cream. The mix of milk, cream and CMF is then held for one hour and 5 (five) hours before homogenization. The product obtained after homogenization, pasteurization, cooling, culturing, separating and packaging initially has the same taste consistency and texture of conventionally manufactured cream cheese. However, it develops oxidized flavors during a shelf life of 4 months at 40° F.

EXAMPLE 3

Figure 2:
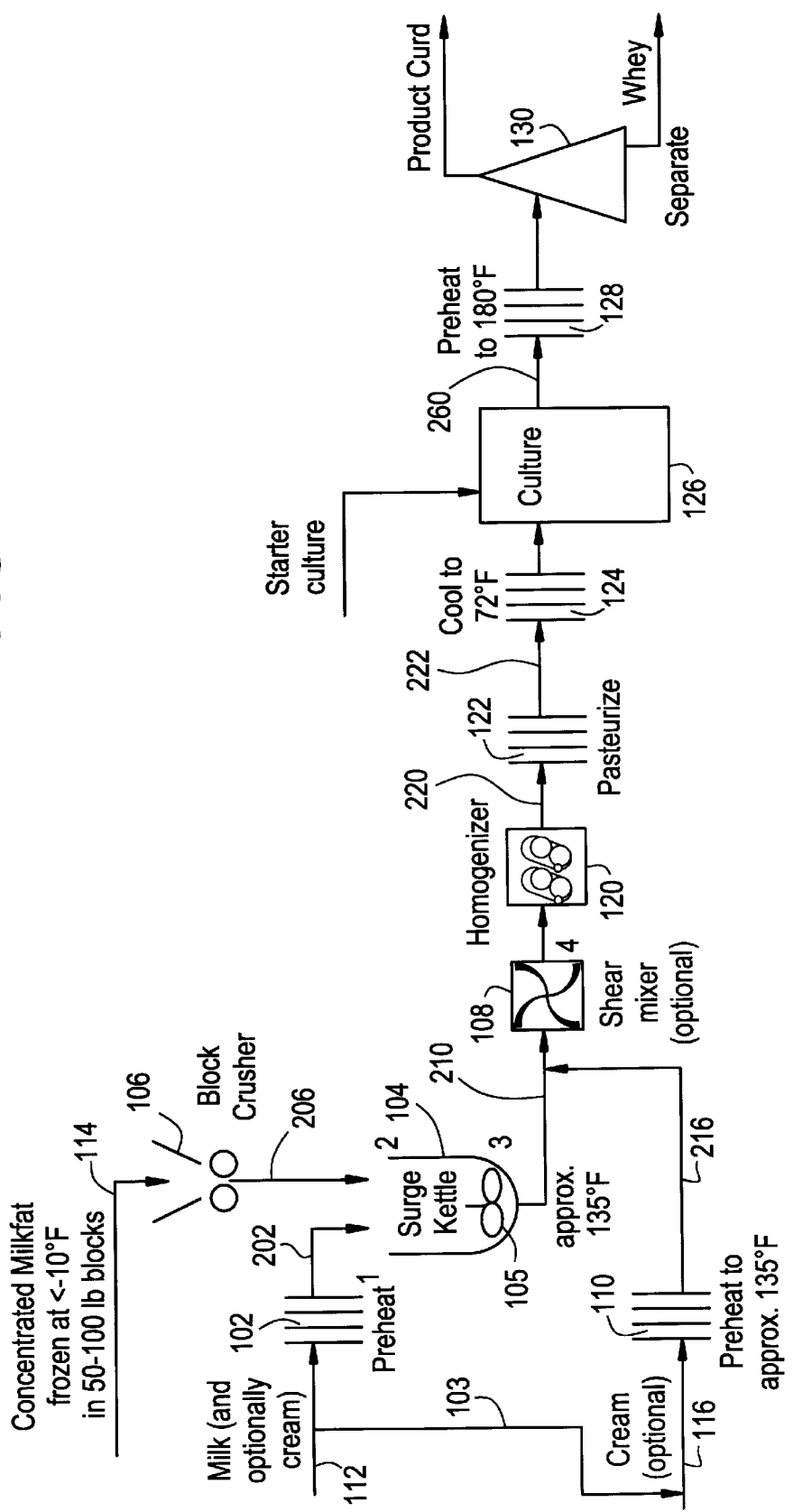
FIG. 2 is a process and equipment diagram illustrating a plant scale method of the invention for producing cream cheese containing concentrated milkfat.

A cream cheese mix is made on a plant scale by means of equipment illustrated in FIG. 2. Approximately 20,000 pounds/hr of fluid milk preheated to a temperature of 165° F. by heater 102 is pumped into a 50 gallon surge kettle at a rate of 333 pounds per minute. Approximately 4,000 pounds of concentrated milkfat in 68 pound blocks at a temperature of −15° F. are fed into a block shredder and introduced into the kettle at a rate of 75 pounds per minute. The shredder produces milkfat shreds having an average weight of approximately 1 g. The uniformly blended mixture at a temperature of about 135° F. is discharged from the kettle at a rate of approximately 410 pounds per minute and combined with unhomogenized sweet cream preheated to 135° F. and having a milkfat content of 42% at a flow rate of 140 pounds per minute. The combined stream is then homogenized at 2500 psi double stage, pasteurized at 178° F. for 17 seconds, cooled to 72° F. and pumped to a processing tank after homogenization. The mixture is inoculated with 20 pounds of commercially available [B-4 H-56] cream cheese starter culture [supplied by Hansen's Laboratories], and is allowed to ripen in a quiescent state for approximately 13 hours at which a pH of approximately 4.5 is reached. The fermented cream cheese mix produced is broken by agitation, heated to 180° F. through a swept surface heater, and pumped to a centrifugal separator to separate the product curd from the whey. Fifteen pounds of a 75 percent by weight salt (NaCl) and 25 percent by weight carob bean gum mixture is added to the heated cultured cream cheese. The finished product analysis in percent by weight is approximately:

| | |
|---|---|
| Moisture | 54.00 |
| Milkfat | 34.20 |
| pH | 4.70 |
| Salt | 0.90 |
| Protein | 5.60 |

The product has excellent shelf life of at least 150 days.

Accordingly, it should be appreciated that in accordance with the present invention, cream cheese products meeting the Federal Standards of Identity with respect to milkfat and moisture content are provided which are produced from concentrated milkfat (solids) stored at low temperature. It will also be appreciated that methods for manufacturing such products are provided in accordance with the invention which will provide for the commercially effective and reliably controllable uniform manufacture of such products.

While the present invention has been particularly described with specific reference to particular product and process embodiments, it will also be appreciated that various alterations, modifications and adaptations may be made based on the present disclosure, and are intended to be within the spirit and scope of the present invention as defined by the following claims.

What is claimed is:

1. A method for manufacturing a cream cheese product comprising the steps of comminuting a concentrated frozen milkfat component which has been stored for at least a month at a temperature not exceeding 20° F., providing a preheated dairy fluid component, combining the comminuted frozen milkfat component and the preheated dairy fluid component to melt the comminuted frozen milkfat component in contact with the preheated dairy fluid component to provide a uniformly blended cream cheese dressing mix, culturing the dressing mix to provide a cultured cream cheese mix having a pH of about 5.2 or less, at least about 10 percent by weight of milkfat, at least about 40 percent by weight of total dairy solids and not more than 70 percent moisture, treating the cultured cream cheese mix to form curd and whey, and separating the curd from the whey to obtain the cream cheese product.

2. A method for manufacturing a cream cheese product in accordance with claim 1 wherein the dairy fluid component is fluid milk and/or cream, and further comprising the steps of pasteurizing and homogenizing the cream cheese dressing mix prior to culturing the mix.

3. A method for manufacturing a cream cheese product in accordance with claim 2 wherein the milkfat component, when contacted with the dairy fluid component, is in the form of shreds.

4. A method for manufacturing a cream cheese product in accordance with claim 2, wherein the combining of the milkfat component and of the dairy fluid component is carried out in less than about 5 hours.

5. A method for manufacturing a cream cheese product in accordance with claim 4, wherein the combining of the milkfat component and of the dairy fluid component is carried out in less than about 10 minutes.

6. A method for manufacturing a cream cheese product in accordance with claim 5, wherein the weight ratio of the milkfat component to the dairy fluid component is from about 2:1 to about 8:1.

7. A method for manufacturing a cream cheese product in accordance with claim 6, wherein the milkfat component is in the form of frozen particles having a surface to volume ratio of at least about 7 when contacted with the dairy fluid component.

8. A method for manufacturing a cream cheese product in accordance with claim 7, wherein the frozen particles have a surface to volume ratio of at least about 25.

* * * * *